(12) United States Patent
Tsutsui et al.

(10) Patent No.: US 6,259,983 B1
(45) Date of Patent: Jul. 10, 2001

(54) HYDRAULIC CONTROL SYSTEM FOR AUTOMATIC TRANSMISSION

(75) Inventors: Hiroshi Tsutsui; Masaaki Nishida; Yoshihisa Yamamoto; Masao Saito; Takayuki Kubo, all of Anjo (JP)

(73) Assignee: Aisin AW Co., Ltd. (JP)

( * ) Notice: Subject to any disclaimer, the term of this patent is extended or adjusted under 35 U.S.C. 154(b) by 0 days.

(21) Appl. No.: 09/119,237

(22) Filed: Jul. 21, 1998

(30) Foreign Application Priority Data

Aug. 13, 1997 (JP) .................................................... 9-218765

(51) Int. Cl.[7] .............................. F16H 9/00; B60K 41/12
(52) U.S. Cl. .................................. 701/51; 701/59; 701/61; 74/856; 74/866; 74/861; 180/233; 477/43
(58) Field of Search ................................. 701/51; 477/48, 477/46

(56) References Cited

U.S. PATENT DOCUMENTS

| | | | | |
|---|---|---|---|---|
| 4,823,267 | * | 4/1989 | Kumura | 364/424.1 |
| 5,695,428 | * | 12/1997 | Yuasa et al. | 477/48 |
| 5,820,514 | * | 10/1998 | Adachi | 477/46 |
| 5,857,937 | * | 1/1999 | Ashizawa et al. | 477/46 |
| 5,931,884 | * | 8/1999 | Ochiai | 701/51 |
| 5,931,885 | * | 8/1999 | Kubo et al. | 701/51 |
| 5,954,776 | * | 9/1999 | Saito et al. | 701/51 |

* cited by examiner

Primary Examiner—William A. Cuchlinski, Jr.
Assistant Examiner—Tuan C To (57) ABSTRACT

A learning controller makes learning correction based on a time $t_{ST}$ between start of a shift control routine and detection of start of a change in rotational speed of the transmission input shaft and further based on the amount of rotational speed change $\omega_S'$ at the detected start of the rotational speed change. When the time $t_{ST}$ is longer than a basic time and when the rotational change amount $\omega_S'$ is too large, it is determined that a servo piston has not been sufficiently advanced and the shift control is corrected so that the time $t_{ST}$ is lengthened. When the time $t_{ST}$ to the detected start of the rotational speed change $\omega_S'$ is too small, it is determined that, while the piston has been advanced properly, the target engagement pressure $P_{TA}$ in torque phase control is too low because of a miscalculation, and the shift control is corrected so that the target engagement pressure is raised.

12 Claims, 7 Drawing Sheets

TARGET ENGAGEMENT PRESSURE $P_{TA}$ WHEN STROKE IS PROPER

FIG. 6(b)

SERVO STARTING CONTROL WHEN STROKE IS NOT PROPER

FIG. 6(c)

WHEN TARGET ENGAGEMENT PRESSURE $P_{TA}$ IS NOT PROPER

HYDRAULIC CONTROL SYSTEM FOR AUTOMATIC TRANSMISSION

BACKGROUND OF THE INVENTION

1. Field of the Invention

The invention relates to a hydraulic control system for an automatic transmission. More specifically, it relates to a hydraulic control system for an automatic transmission which corrects shift controls, including a servo starting control, by learning.

2. Description of the Related Art

Japanese Patent Publication No. 179676/1993 describes a conventional control with learning for starting time of servo control of a clutch which is engaged in a shift. In servo starting control clearance between the friction pads of the clutch is decreased and the clutch is taken to the state just before start of engagement. In this control procedure, turbine rotational speed is detected as an input shaft rotation speed, and the time between a shift control start and start of speed change in input shaft rotation, which is the start of the torque phase, is measured. Then this measured time and a stored basic servo filling time are compared, and the hydraulic pressure applied to the hydraulic servo is corrected so that the measured time comes to equal the basic filling time. That is to say, when the time between shift control start and the start of change in rotational speed of the input shaft is longer than a predetermined basic time, it is determined that the filling of the hydraulic servo for the engagement side clutch (clutch which is engaged in the shift) is not sufficient, and the hydraulic pressure applied to the hydraulic servo for the engagement side clutch is corrected so that the time for starting servo control is increased. Conversely, when the time between the shift control start and the start of change in rotational speed of the input shaft is shorter than the predetermined basic time, it is determined that the filling state of the hydraulic servo is too great, and the hydraulic pressure applied to the hydraulic servo for the engagement side clutch is corrected so that the time for starting the servo control is decreased.

But the phenomenon, in which the time from start of the shift control to the rotational change in speed of the input shaft is longer than the predetermined value, is not limited to the case in which the filling of the hydraulic servo is insufficient. When the rate of increase of the hydraulic pressure for engagement after start of the servo control is too low, the time from the start of shift control to the start of rotational speed change is increased even if the starting of servo control is performed properly. According to the prior art, in this case, it is determined that the filling state of the hydraulic servo is insufficient and the time for starting the servo control is corrected to be longer. Therefore, the hydraulic servo is filled and engagement of the engagement side clutch is started too early. Then, a shift shock occurs because of a tie-up with a disengagement side clutch which is disengaged in the shift.

SUMMARY OF THE INVENTION

Therefore, an object of the invention is to provide a hydraulic control system for an automatic transmission, which solves the aforementioned problem by proper learning control.

In order to achieve the aforementioned object, the hydraulic control system of the present invention provides a novel shift control for a shift to a predetermined gear ratio by engaging a first frictional engagement element and disengaging a second frictional engagement element. The shift control system comprises an input shaft which receives power from an engine output shaft, an output shaft which is connected to vehicle wheels, a plurality of frictional engagement elements for changing the power transmission path between the input shaft and the output shaft, including the first frictional engagement element and the second frictional engagement element, hydraulic servos that engage and disengage the frictional engagement elements, a rotation change start detector which detects start of a change in rotational speed of the input shaft, a rotation change amount detector which detects the amount of rotational change at the start of the rotational speed change, a learning controller which corrects the shift control based on the time period from start of a shift control to the start of rotational speed change detected by the rotation change start detector and the amount of change in the rotational speed detected by the rotation change amount detector at the start of the rotational speed change, and an adjusting device which adjusts at least an engagement side pressure applied to the hydraulic servo for the first frictional engagement element, based on a signal from the learning controller.

The learning controller corrects a servo starting control, in which a piston is advanced by applying a hydraulic pressure to the hydraulic servo for the first frictional engagement element and the frictional engagement element is brought to a state just before torque transmission. Further, the learning controller corrects the torque phase control, which increases the hydraulic pressure in the hydraulic servo for the first frictional engagement element to a target for the engagement pressure just before the start of the rotational speed change. When the time between the start of the shift control start and the rotational speed change start is longer than a predetermined basic time and the amount of rotational change is larger than a predetermined value, it is determined that the filling state for the first frictional engagement element servo is insufficient, and the learning controller corrects so that the time for the servo starting control is increased.

Conversely, when the time period extending from the shift control start (t=O) to the rotation change start ($t_{ST}$) is longer than a predetermined basic time and the amount of rotational change is smaller than a predetermined value, it is determined that the target engagement pressure is too low, and the learning controller corrects so that the target engagement pressure is increased.

The start of change of the rotational speed of the input shaft is preferably detected as a change in the rotational speed of the input shaft relative to the rotational speed of the output shaft, i.e. as related to the beginning of a shift to the predetermined gear ratio.

According to the invention, the learning control is performed based on both (1) the time ($t_{ST}$) from the shift control start to the start of change in the rotational speed of the input shaft and (2) the amount of rotational speed change at that time. Therefore, the shift control is performed properly and undesirable phenomena such as shift shock are reduced.

According to the invention, moreover, when the time ($t_{ST}$) from the shift control start to the start of change in rotational speed of the input shaft is longer than the predetermined basic time and the amount of rotational change at the time of the rotational change start is larger than the predetermined value, the time for the servo starting control is corrected to be longer. Therefore, the servo starting control is properly corrected and a shift shock which would result from a large rotational change at the shift start is prevented.

Moreover, when the time from the shift control start to the start of rotational speed change at the input shaft is longer than the predetermined basic time and the amount of the rotational change at the rotational speed change start is smaller than the predetermined value, the target engagement pressure is increased for correction. Therefore, an erroneous learning correction for the servo starting control is prevented. As a result, the time from the shift control start to the shift start is shortened and sensation of a long shift time is avoided.

Further, the start of rotational change of the input shaft is detected based on the gear ratio. Therefore, the rotational change start is detected by a simple rotational speed detector and the difference relative to the output shaft rotational speed is easily and correctly determined. Moreover, the time of the rotation change detection is regarded as the time of the shift start. Then, the calculation of the amount of rotational change at the time of rotational change start is made easily and correctly. Further, the detection of the time of the shift start may be used in other controls, for example, a control in which a line pressure is reduced at a shift and a control in which engine torque is reduced. Therefore, additional dedicated detectors are not needed and cost is thereby reduced.

BRIEF DESCRIPTION OF THE DRAWINGS

The invention will be described in conjunction with the following drawings in which like features are designated with like reference characters, and wherein.

DETAILED DESCRIPTION OF THE INVENTION

Preferred embodiments of the present invention are described in the following with reference to the accompanying drawings.

An automatic transmission includes many frictional engagement elements such as clutches and brakes, a planetary gear mechanism and a shift controller mechanism for selecting a path for power transmission through the planetary gear mechanism by suitably engaging and disengaging the frictional engagement elements. The input shaft of the automatic transmission mechanism is connected to the output shaft of an engine through a torque converter. The output shaft of the automatic transmission mechanism is connected to the drive wheels.

Figure 1:
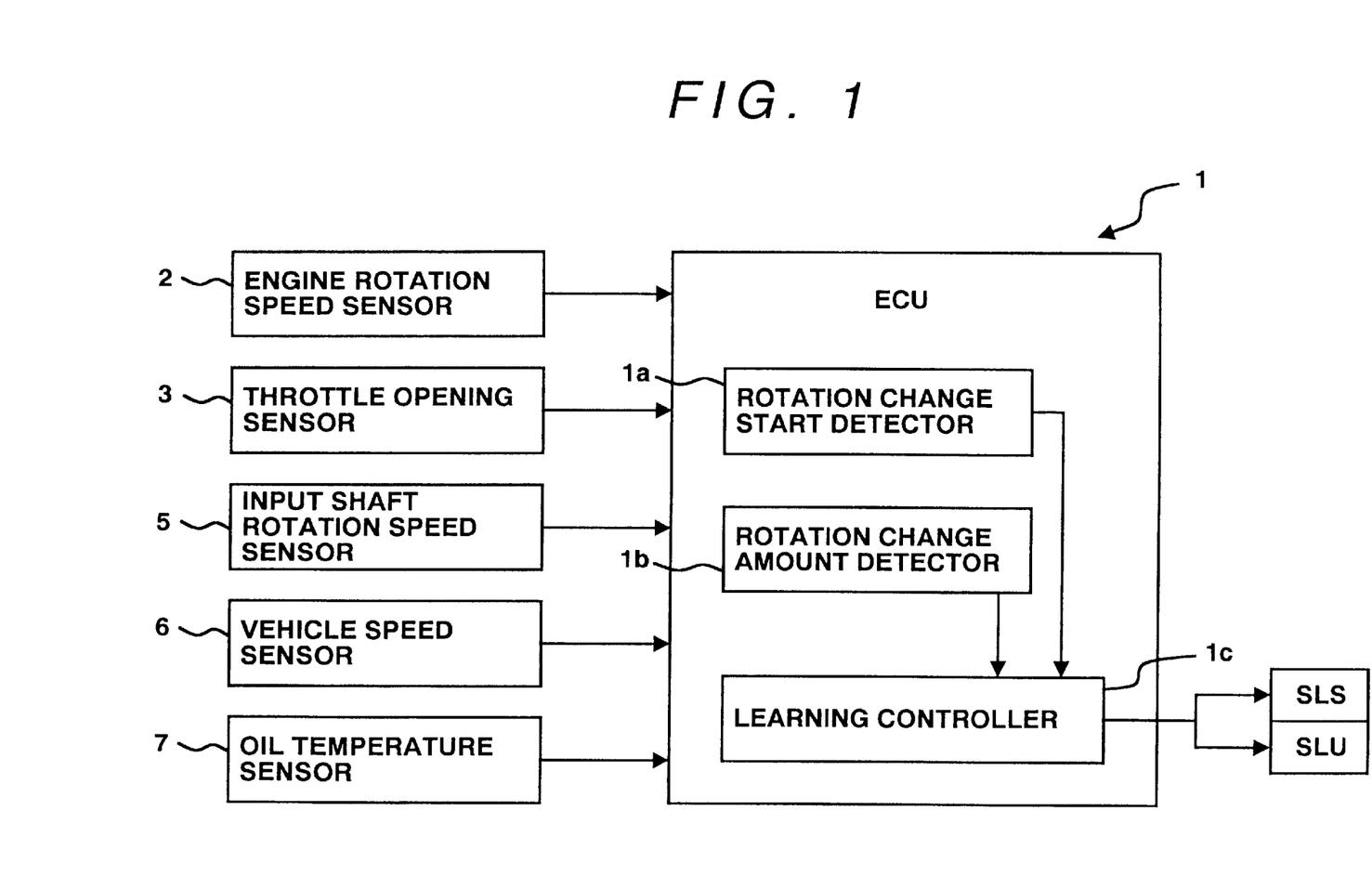
FIG. 1 is a block diagram of the control system of the invention.

FIG. 1 is a block diagram illustrating an electronic control system according to the present invention. The control unit 1 is a microcomputer. The control unit 1 receives input signals from an engine speed sensor 2, a throttle opening sensor 3 which detects accelerator pedal movement, an input shaft rotational speed sensor 5 which detects rotational speed of the transmission input shaft (=turbine rotation speed), a vehicle speed (=automatic transmission output shaft rotational speed) sensor 6, and an oil temperature sensor 7. Further, the control unit 1 outputs signals to linear solenoid valves SLS and SLU in the hydraulic circuit. The control unit 1 comprises a rotation change detector 1a which determines start of change in the rotational speed of the input shaft (torque phase start or inertia phase start) based on the signals from the input shaft rotational speed sensor 5 and the vehicle speed sensor 6, a rotation change amount detector 1b which detects the amount of rotational change (using a time differential equation for rotational speed change, i.e. for rotational change rate or angular acceleration) at the start of a shift (start of a rotational change detected in accordance with the gear ratio), and a learning controller 1c which corrects a shift control, such as servo starting control, based on the time period between the shift control start and the start of the rotational change as detected by the rotation change start detector 1a and on the amount of the rotational change detected by the rotation change amount detector 1b. The learning controller 1 outputs predetermined control signals to linear solenoid valves SLS, SLU as adjusting devices.

Figure 2:
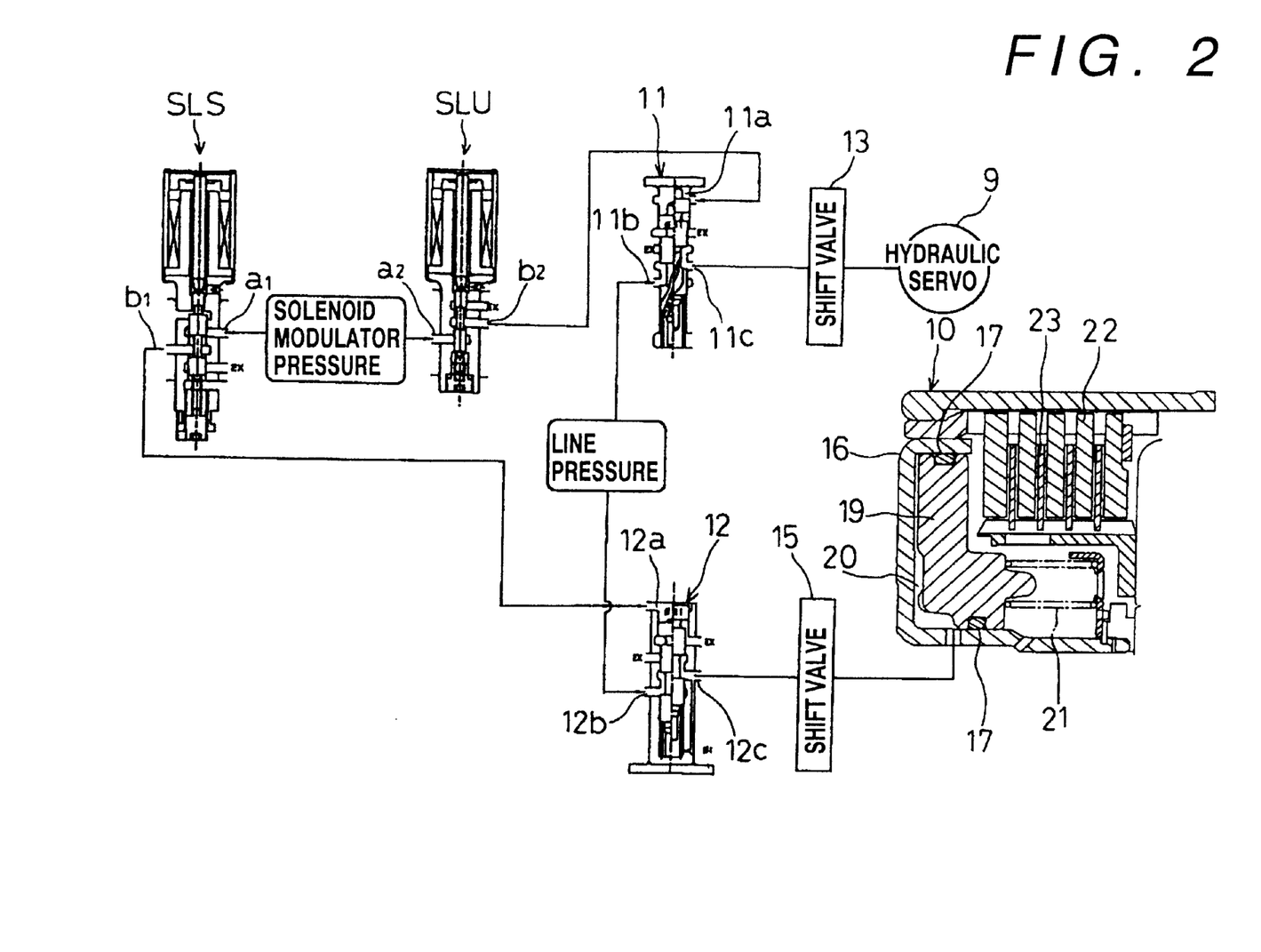
FIG. 2 is a hydraulic circuit diagram of one embodiment of a hydraulic control circuit in accordance with the present invention.

FIG. 2 shows the hydraulic circuit as including the two linear solenoid valves SLS, SLU (adjusting devices) and a plurality of hydraulic servos 9, 10 that engage and disengage a plurality of frictional engagement elements (clutches and brakes) to selectively establish various gear ratios. For example, four or five forward drive ratios and one reverse drive ratio may be achieved by changing the transmission torque path through the planetary gear unit of the automatic transmission mechanism. Input ports $a_1$, $a_2$ of the linear solenoid valves SLS and SLU receive a solenoid modulator pressure. The linear solenoid valves SLS, SLU each supply a control pressure from their output ports $b_1$, $b_2$ to control chambers 11a, 12a of pressure control valves 11, 12. Input ports 11b, 12b of the pressure control valves 11, 12 receive a line pressure. The pressure regulated by the control pressure is suitably applied from the output ports 11c, 12c to the hydraulic servos 9, 10 via shift valves 13, 15, respectively.

The hydraulic circuit of FIG. 2 is shown merely to illustrate the basic concept of the present invention, and the hydraulic servos 9, 10 and the shift valves 13, 15 are illustrative and merely representative of numerous such components in the hydraulic control circuit. Actually, the automatic transmission mechanism is provided with many more such hydraulic servos and many more such shift valves for switching hydraulic pressures to the hydraulic servos. In each hydraulic servo, as represented by the hydraulic servo 10, a piston 19 is slidably arranged in a cylinder 16, which is oil-tight by provision of an oil seal 17. The piston 19 is advanced against the force of a return spring 21 to bring the outer frictional plates 22 into engagement with inner frictional members 23 by the regulated pressure applied from the control valve 12 to the hydraulic chamber 20 of the servo. Although the frictional plates and members are shown in the form of a clutch in FIG. 3, it should be understood that a brake may be constructed and operated in a similar manner.

Figure 3:
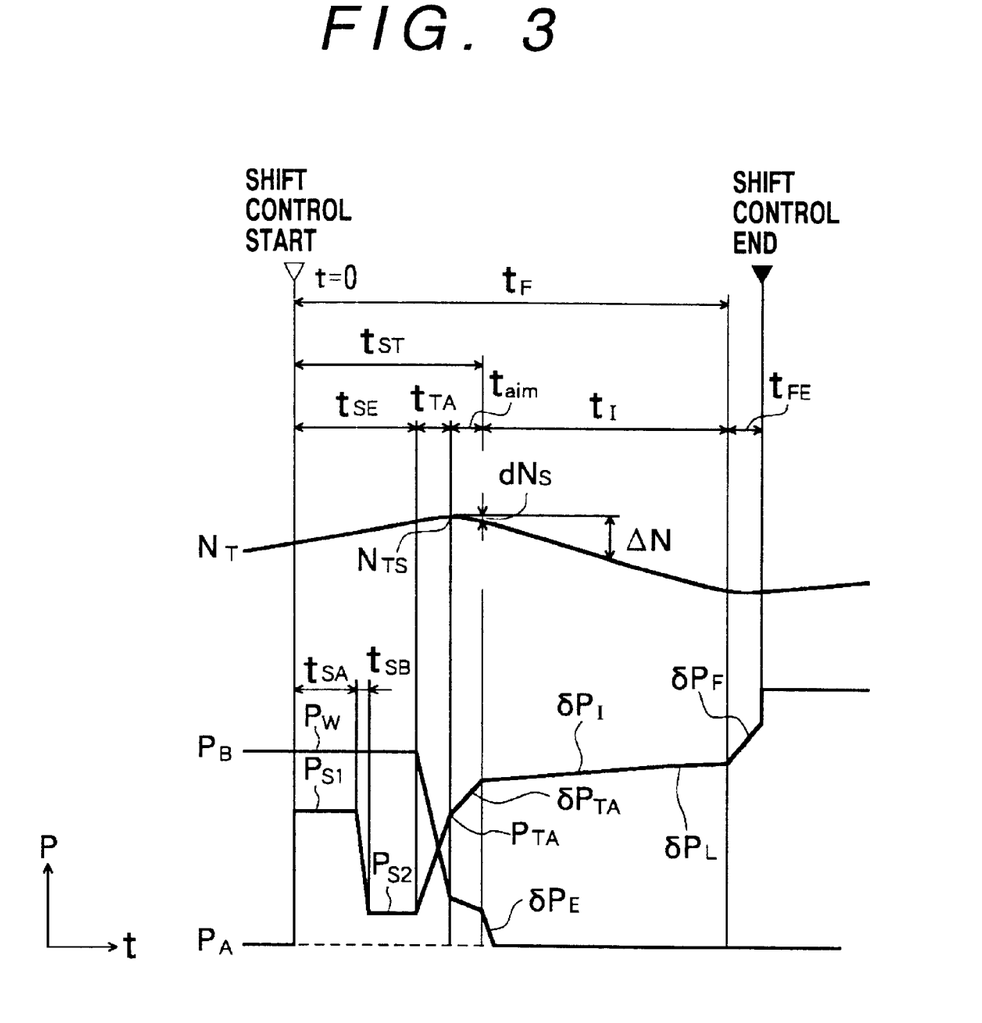
FIG. 3 is a time chart showing control signal pressures, that are basis of the invention, for an engagement side pressure and a disengagement side pressure.
Figure 4:
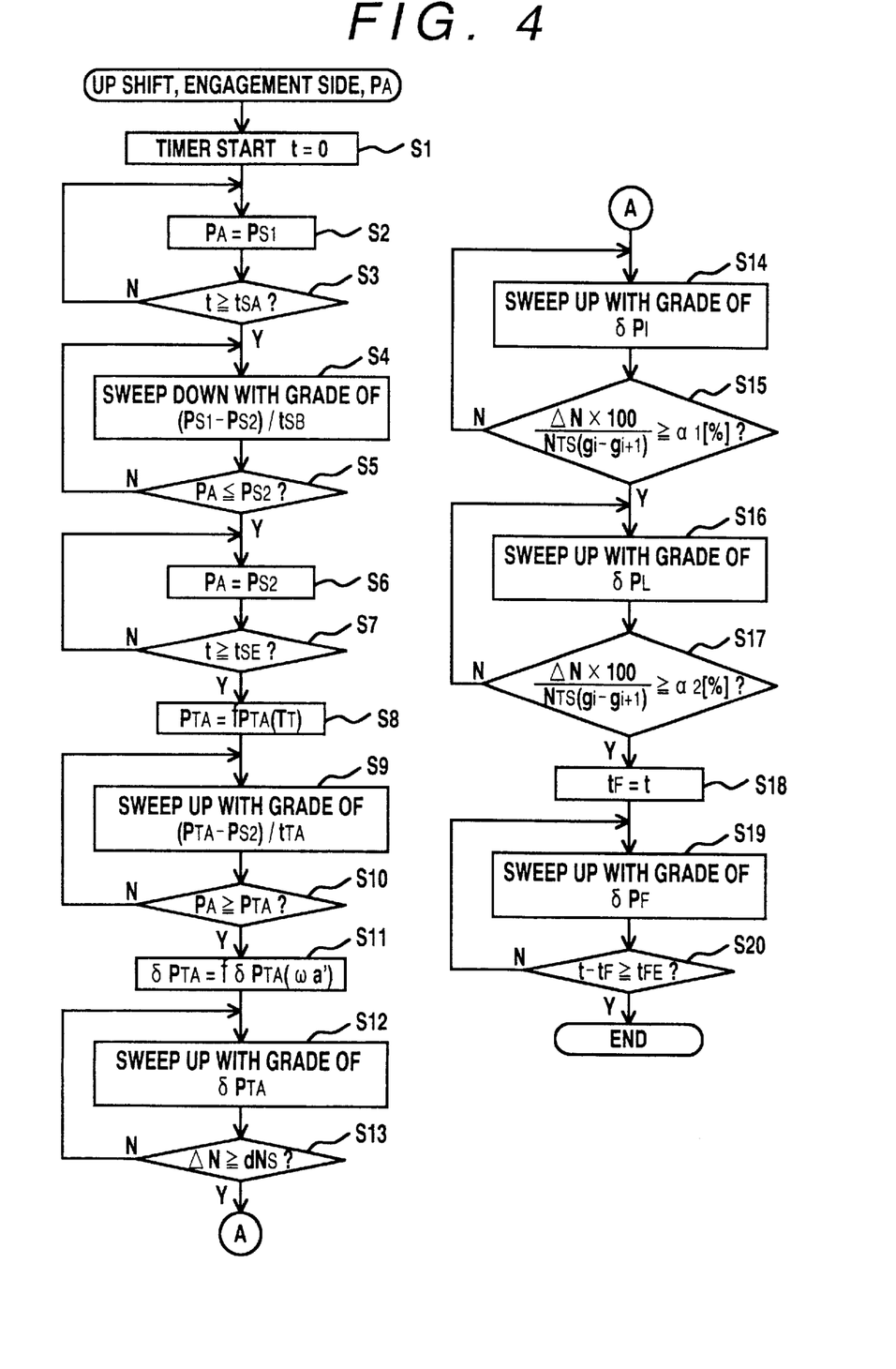
FIG. 4 is a flow chart of a routine for engagement side hydraulic control in an up-shift.
Figure 5:
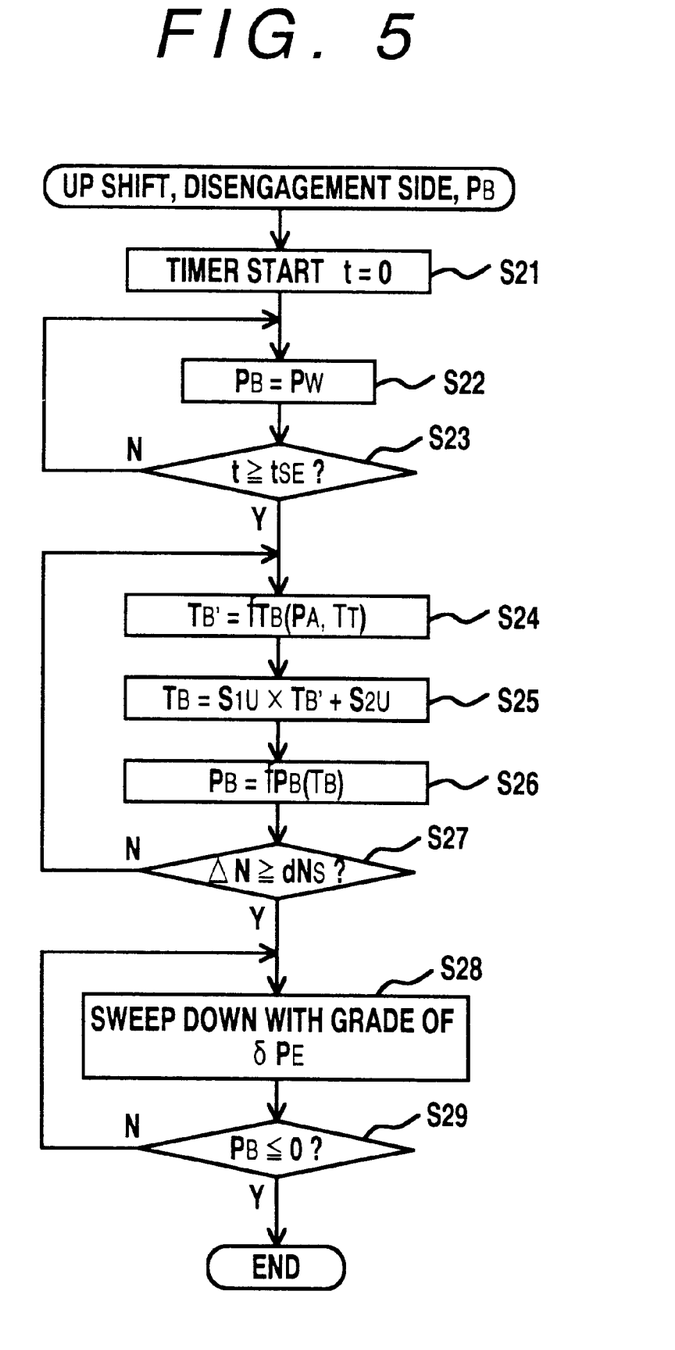
FIG. 5 is a flow chart of a routine for disengagement side hydraulic control in an up-shift.

Next, operation of a hydraulic control system of the invention will be explained with reference to FIG. 3, FIG. 4, and FIG. 5.

A shift such as an up-shift from second gear to third gear is determined by applying, to a shift map stored in the control unit 1, the signals from the throttle opening sensor 3 and the vehicle speed sensor 6. After a predetermined time for preparation operations for a shift valve (for the determined shift) has elapsed, a shift control routine for control of engagement side pressure $P_A$ and disengagement side pressure $P_B$ is started. In the shift control, assuming the driver keeps an almost constant pressure on the accelerator pedal during the shift, an up-shift control routine is executed in a power on state in which power is transmitted from the engine to the vehicle drive wheels. Then, a predetermined signal is output to the linear solenoid valve SLS (or SLU) so that the hydraulic pressure (engagement pressure) applied to the engagement side hydraulic servo is brought to a predetermined pressure $P_{S1}$ at step S2. The predetermined pressure (pressure limit) $P_{S1}$ is set for filling up the hydraulic chamber 20 of the hydraulic servo, and is maintained for a predetermined time $t_{SA}$. After the predetermined time $t_{SA}$ at step S3, the engagement side pressure $P_A$ is decreased over time with a predetermined rate of decrease $(P_{S1}-P_{S2})/t_{SB}$ (hereinafter referred to as "sweep down") in step S4. When the engagement side pressure $P_A$ reaches a predetermined lower limit pressure $P_{S2}$ at step S5, the sweep-down is stopped, and the engagement side pressure $P_A$ is kept at the predetermined low pressure $P_{S2}$ at step 56. The predetermined low pressure $P_{S2}$ is set higher than the pressure required to advance the piston so that change in the rotational speed of the input shaft is not yet initiated. The predetermined low pressure $P_{S2}$ is maintained until a timer detects lapse a predetermined time $t_{SE}$ at step S7.

A target engagement pressure $P_{TA}$ for a time just before start of change in the rotational speed $N_T$ (just before the inertia phase start) of the input shaft (relative to the output shaft) is calculated based on a predetermined equation $P_{TA}=f_{PTA}(T_T)$, i.e. as a function of the input torque $T_T$, in step S8. The target engagement pressure $P_{TA}$ is calculated as follows. First, an allotment torque $T_A$ for an engagement side torque$(=1/a*T_T$, wherein $1/a$ is the torque allotment ratio) is calculated. Then, the target engagement pressure $P_{TA}$ is calculated as $P_{TA}=(T_A/A_A)+B_A+dP_{TA}$ wherein $B_A$ is the hydraulic pressure applied to the servo piston (=spring load); $A_A$ is the frictional pad effective radius X the piston area X the number of friction pads X coefficient of friction of the frictional engagement element; and $dP_{TA}$ is an increment of hydraulic pressure for delay. The predetermined grade is calculated from the formula $(P_{TA}-P_{S2})/t_{TA}$ based on the target engagement pressure $P_{TA}$, which is calculated based on the input torque $T_T$, and a predetermined time $t_{TA}$. Then, the engagement side pressure $P_A$ is increased over time with a predetermined rate of increase (hereinafter referred to as "sweep-up") in step S9. In the first sweep-up having a comparatively steep rate, the engagement torque is increased and the engagement side pressure $P_A$ is increased to the target engagement pressure $P_{TA}$ in step S10. In this state, the torque allotted to the engagement side clutch is increased and the torque allotted to the disengagement side clutch is decreased, and the gear ratio is that before the up-shift (second gear), and the torque phase, in which only the torque allotment is changed, is established. The target engagement pressure $P_{TA}$ is calculated so that the allotment torque of the engagement side clutch is greater than the input torque.

The input torque $T_T$ (=turbine torque) is determined as follows. First, the engine torque is determined by linear interpolation on a map based on the throttle opening and the engine rotational speed, in accordance with the vehicle driving state. Next, a speed ratio is calculated based on the input and output rotational speeds of the torque converter. Then, a torque ratio is determined from a map based on the speed ratio. Then, the input torque $T_T$ is obtained by multiplying the engine torque by the torque ratio.

When the engagement side pressure $P_A$ reaches the target engagement pressure $P_{TA}$, that is to say, when the inertia phase is begun and the input shaft rotational speed $N_T$ begins to change, the change $\delta P_{TA}$ of the engagement side pressure $P_A$ is calculated as $\delta P_{TA}=f\delta P_{TA}(\omega a')$ for a target rotational rate change ($d\omega s/dt$, represented in the foregoing equation as $\omega a'$) that is set as a target when the input shaft rotational speed $N_T$ begins to change (S11). The change of the hydraulic pressure $\delta P_{TA}$ is calculated as $\delta P_{TA}=(I*\omega a')/(k*t_{aim})$, wherein k is a constant, $t_{aim}$ is the target shift start time, $\omega a'$ is a target rotational speed change rate (rate of change in reaching the target rotational speed), and I is the amount of inertia. Then the sweep-up is applied to the engagement side pressure $P_A$ with a grade of $\delta P_{TA}$ in step S12. The second sweep-up is continued until the rotational change $\Delta N$ reaches $dN_S$, which is an amount of change predetermined to indicate shift start, in step S13. The rotational speed change $\Delta N$ is the amount of rotational change from an input rotation speed $N_{TS}$ at the start of the rotational change.

The target shift start time $t_{aim}$ is set as a function of the input shaft rotational speed $N_T$.

The rotational change start of the input shaft rotation speed $N_T$ is the inertia phase start, that is to say, a state in which a shift (shift from the second gear ratio to the third gear ratio) to a new gear ratio is started and the input shaft rotational speed relative to the output shaft rotational speed starts to change, indicative of start of change to the new gear ratio. The rotational change start for the input shaft rotation speed $N_T$ is detected based on signals from the input shaft rotation speed sensor 5 and the vehicle speed sensor 6. The detection of the rotational change start for the input shaft rotational speed $N_T$, as detected by the rotational change start detector 1a, is not limited to the case of detection of the rotational change based on the gear ratio (inertia phase start). It is also possible to detect a rotational change in the torque phase because the change in the input shaft rotational speed $N_T$ related to the change of the torque allotment is started.

In the invention, the rotational speed change dNs indicative of the shift start, which is the start of change of the input shaft rotational speed NT based on a change in the gear ratio, is detected by the rotation change detector 1a. The time at which the rotational change dNs is detected is taken as the shift start. The time $t_{ST}$ (start time) is the timer period extending from the shift control start (t=0) to the time at which the rotational speed change dNs is detected. Further, the angular acceleration dNs/dt of the input shaft, indicated as a rotational speed change rate $\omega_S'$, is detected by the rotation change amount detector 1b. In general, the rotation change rate $\omega_S'$ is almost the same as the target rotation change rate $\omega_a'$.

An engagement side pressure change $\delta P_I$ is set by feedback control based on the amount of change in the rotational speed $\Delta N$ which, in turn, is based on the values detected by the input shaft rotational speed sensor 5. Then the engagement side pressure $P_A$ undergoes sweep-up with a slope (grade) $\delta P_I$ in step S14. The sweep-up with the grade of the $\delta P_I$ is continued until $\alpha_1\%$, for example 70%, of the rotational change amount $\Delta N$ at the completion of the shift is ended in step S15. That is to say, the sweep-up with the grade of the δ $P_I$ is continued until $(\Delta N*100)/N_{TS}(g_i-g_{i+1})$ becomes $\alpha_1\%$ wherein $N_{TS}$ is input shaft rotational speed at the shift start, ΔN is the amount of rotational speed change, $g_i$ is the gear ratio before shift, and $g_{i+1}$ is the gear ratio after the shift.

After exceeding $\alpha_1\%$ of the total rotational speed change ΔN, hydraulic pressure change δ $P_L$ is set in deference to δ $P_I$ by a feedback control based on the total rotational change ΔN. Then the sweep-up of engagement side pressure $P_A$ is performed with the grade of δ $P_L$ in step S16. Generally, the hydraulic pressure change δ $P_L$ is slightly more gentle than δ $P_I$. That sweep-up is continued until $\alpha_2\%$, for example 90%, of the amount of rotational change ΔN through the end of the shift is reached step S17. The target shift time $t_I$ for the sweep-up with the grades δ $P_I$ and δ $P_L$ is set based on a throttle-opening/vehicle speed map which is chosen in accordance with the oil temperature.

After the target shift time $t_1$ has elapsed, a race time $t_F$ is set in step S18. Time $T_F$ ends at a point which almost corresponds to the end of the inertia phase. Further, a hydraulic pressure change δ $P_F$ which is comparatively steep is set, and the engagement side pressure $P_A$ undergoes a steep sweep-up with the grade of δ $P_F$ in step S19. After a predetermined time $t_{FE}$, which is set as a time sufficient for increasing $P_A$ to the engagement pressure, has elapsed after the end of race time $t_F$ in step S20, the hydraulic control for the engagement side pressure $P_A$ is ended.

Control of the disengagement side pressure $P_B$ in the above-described up-shift will now be described with reference to FIG. 3 and FIG. 5. FIG. 3 shows the control for both engagement and disengagement, that is to say, a clutch to clutch shift. Specifically, the shift is from second gear to third gear. The control routine of FIG. 5 can also be used for control of only the engagement pressure when a one-way clutch is used on the disengagement side.

A timer for the control of the disengagement side pressure $P_B$ is started at the same time with the timer for the engagement side by a shift order from the control unit 1 in step S21. At that time, the disengagement side pressure $P_B$ is kept at a high pressure $P_W$ needed for engagement in step S22. The application with the high pressure $P_B$ is kept until the engagement side pressure $P_A$ starts the first sweep-up (torque phase start) $(t_{SE})$ in step S23.

Then, a disengagement side temporary torque $T_B'$ is calculated as a function of the engagement side pressure $P_A$ and the input torque $T_T$ in step S24, i.e. $T_B'=f_{TB}(P_A, T_T)$ Further, a disengagement side torque $T_B$ is calculated as a function of surplus rates $S_{1U}$, $S_{2U}$, i.e. $T_B=S_{1U}*T_B'+S_{2U}$, in step S25. Then, the disengagement side pressure $P_B$ is calculated based on the functional relationship $P_B=f_{PB}(T_B)$, i.e. as a function of the disengagement side torque $T_B$, in step S26. That is to say, an allotment torque $T_A$ allotted to the engagement side frictional engagement element is calculated based on the formula $T_A=A_A* (P_A-B_B)$ wherein $A_A$ is the effective radius of the engagement side frictional engagement element X a piston area of the servo piston X a constant X the coefficient of friction and $B_B$ is the pressure applied to the servo piston. Further, the temporary allotment torque $T_B'$ allotted to the frictional engagement element on the disengagement side is calculated based on the formula $T_B'=(1/b)T_T-(a/b)T_A$, wherein 1/b is the torque allotment fraction for the disengagement side, 1/a is the torque allotment fraction for the engagement side, and $T_T$ is the input shaft torque. Then, an extent for tie-up with the engagement side frictional engagement element is set based on the surplus rates $S_{1U}$, $S_{2U}$, in consideration of the sensation of the shift felt by the driver and the disengagement side torque $T_B$ is calculated based on the formula $T_B=S_{1U}*T_B'+S_{2U}$. The surplus rates $S_{1U}$, $S_{2U}$ are determined from a map (graph) of the throttle opening and the vehicle speed, selected from many maps for different oil temperatures so that a driver will be satisfied with the feel of the shift. In general, $S_{1U}>1.0$, $S_{2U}>0.0$ are satisfied. Further, the disengagement side pressure $P_B$ is calculated based on the disengagement side torque $T_B$ considered with the surplus rate with a formula $[P_B=(T_B/A_B)+B_B]$, wherein $A_B$ is the effective radius of the disengagement side frictional engagement element X the piston area of the servo piston X a constant X the coefficient of friction and $B_B$ is the pressure applied to the servo piston on the disengagement side.

Because the sweep-down of the disengagement side pressure $P_B$, calculated as above, is correlated with the engagement side pressure $P_A$, the sweep-down has two different grades which change at the inertia phase start (end of $t_{TA}$) when the input shaft rotational speed change is started. That is to say, the sweep-down includes a first sweep-down phase having a comparatively steep grade corresponding to the first sweep-up phase of the engagement side pressure $P_A$ and a second sweep-down phase having a comparatively gentle grade corresponding to the second sweep-up phase of the engagement side pressure $P_A$. Then, the sweep-down is continued until the amount of the input shaft rotational speed change ΔN reaches the predetermined rotational change start, i.e. detection of rotational speed change dNs in step S27. Next, a change rate δ $P_E$ for the disengagement side pressure $P_B$ is set, and sweep-down is performed at the rate of δ $P_E$ in step S28. The sweep-down is continued until the disengagement side pressure $P_B$ reaches 0 in step S29, and then, the hydraulic control for the disengagement side pressure is ended.

Next, learning correction in the shift control of the invention will be described with reference to FIG. 6 through FIG. 8.

Figure 6A:
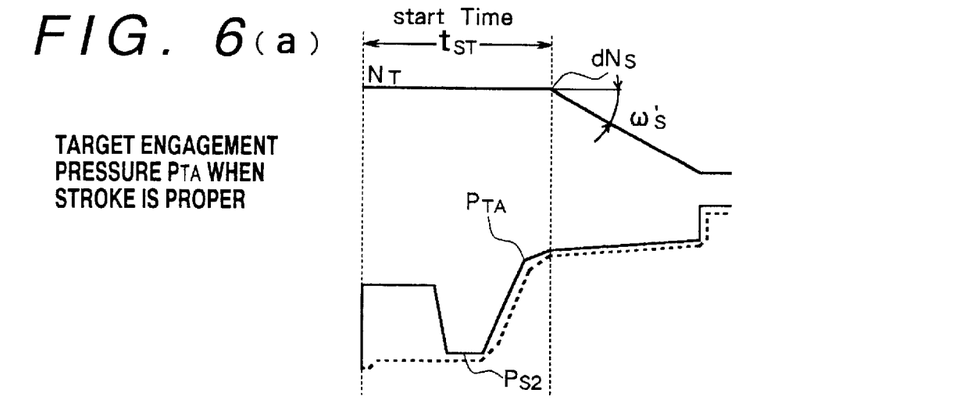
FIG. 6(a) is a time chart showing the control signal for the engagement side pressure for the case wherein the target engagement pressure $P_{TA}$ and shift starting control are proper.

FIG. 6(a) shows an engagement side control pressure signal in the case in which the target engagement pressure $P_{TA}$ and the piston advance is proper in the servo starting control. The dotted line represents the actual hydraulic pressure applied to the hydraulic servo. The solid line representing the input shaft rotational speed $N_T$ shows the rotational change as a change in input shaft rotational speed relative to the output shaft rotational speed, i.e. a change related to a change in the gear ratio. FIGS. 6(b) and (c) are similar graphs illustrating instances of improper control.

Figure 7:
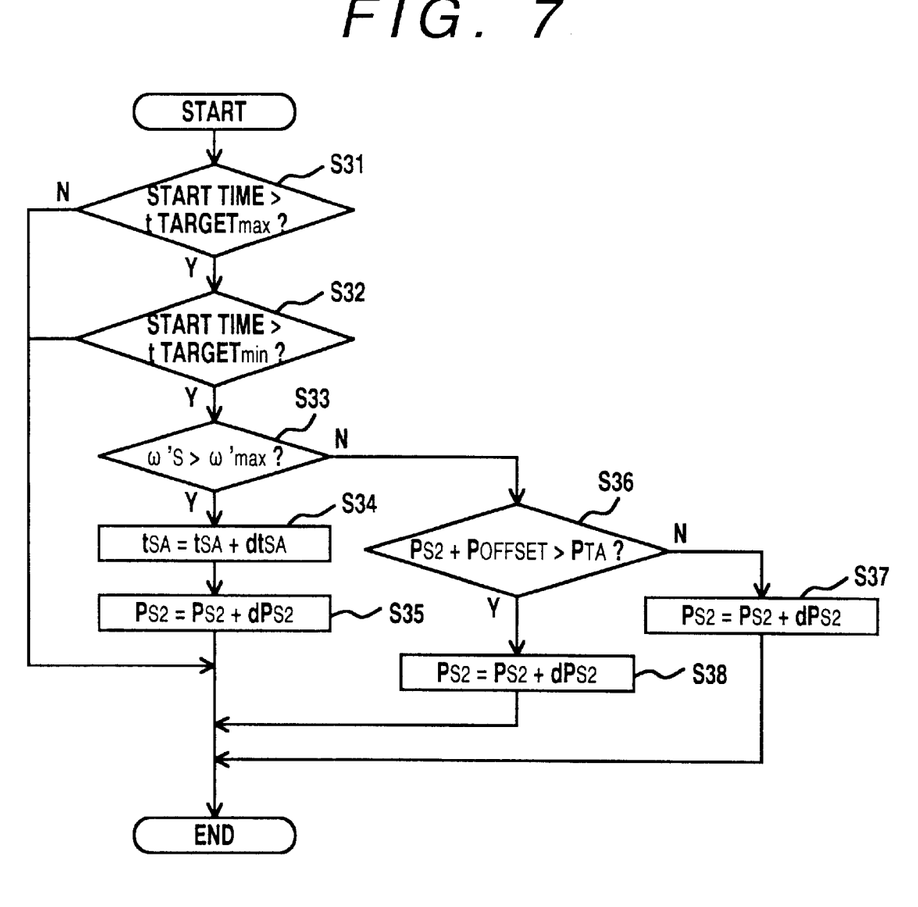
FIG. 7 is a flow chart of a routine for learning control according to the invention.

As shown in FIG. 7, a start time $t_{ST}$, which is the time required for start of the rotational change, will be shorter than a target time maximum value (t target max) in step S31 and longer than a target time minimum value (t target min) in step S32. The rotational change rate $\omega_S'$ (dNs/dt) at the start of the input shaft rotational speed change is smaller than a target change rate maximum value $\omega'$ max and the rotational change rate $\omega_S'$ (dNs/dt) is within a proper range in step S33. The target time maximum value (t target max), the target time minimum value (t target min), and the target change rate maximum value $\omega'$ max are set, predetermined values.

Figure 6B:
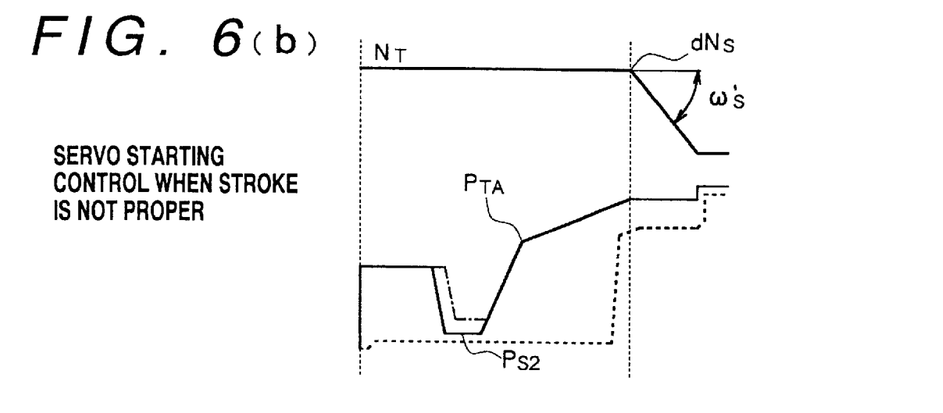
FIG. 6(b) is a time chart showing the control signal for the engagement side pressure for a case wherein shift starting control is improper.

FIG. 6(b) shows the case in which the filling of the engagement side hydraulic servo in the servo starting control is not sufficient and the advance of the servo piston is not proper. In this case, the target engagement pressure $P_{TA}$ is properly calculated. The hydraulic pressure in the early part of the torque phase control, which undergoes sweep-up to the target engagement pressure $P_{TA}$, is used for advancing the piston in the servo starting control because the filling in the servo starting control is not sufficient. Therefore, the start time $t_{ST}$, which is the time until the input shaft rotational change (dNs) is started, is lengthened. Further, the rotational change rate $\omega_S'$ is increased to a large value because the engagement side control pressure signal is high at the start of the rotational change at the input shaft.

In this case, in FIG. 7, the start time $t_{ST}$ is longer than the target time maximum value (target max) in step S31, and the rotational change rate $\omega_S'$ is larger than the target change rate maximum value $\omega_S'$ max in step S33. Then, in the next step S34, the filling time $t_{SA}$ for filling to the predetermined high pressure ($P_{S1}$) in the servo starting control is corrected so as to be lengthened to a predetermined time ($t_{SA}=t_{SA}+dt_{SA}$). Further, in the next step S35, the aforementioned predetermined low pressure $P_{S2}$ is corrected to be increased to a predetermined amount. The engagement side control hydraulic pressure signal after performing the learning correction is shown as the line with alternating long and short dashes in FIG. 6(b).

Figure 6C:
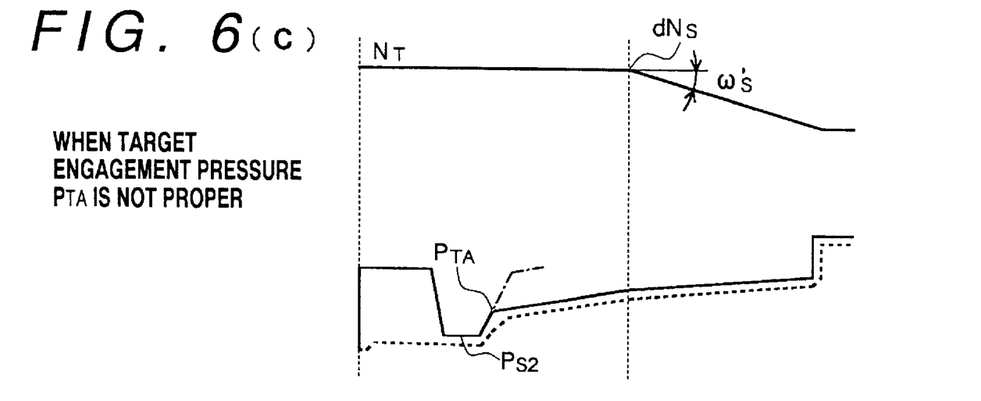
FIG. 6(c) is a time chart showing the control signal for the engagement side pressure for a case wherein the target engagement pressure is improper.

FIG. 6(c) shows the case in which the input shaft rotational speed change is started late, subsequent to the predetermined time, and the target engagement pressure $P_{TA}$ is not proper. In this case, even though the servo piston is advanced properly in the servo starting control and the engagement side clutch is in the state which immediately precedes engagement, the time ($t_{ST}$), i.e. the time required for input shaft rotational speed change to reach dNs with the second sweep-up set to reach the target rotational speed change rate $\omega$ a', is too long because the calculated target engagement pressure $P_{TA}$ is lower than the proper value because of, for example, a miscalculation in the torque phase control. Further, the engagement side pressure $P_{TA}$ is gently increased. Therefore, the rotational change rate $\omega_S'$ at the shift start is small.

That is to say, as shown in FIG. 7, when the start time $t_{ST}$ is larger than the target time maximum value (t target max) in step S31 and the rotational speed change rate $\omega_S'$ is smaller than the rotational speed change rate maximum value $\omega'$ max in step S33, the routine goes to step S36. In step S36, the sum of the added predetermined value $P_{OFF\ SET}$ and the predetermined low pressure $P_{S2}$ in the servo starting control is compared with the target engagement pressure $P_{TA}$ ($P_{S2}+P_{OFF\ SET}>P_{TA}$?). When the input torque is extremely small and when the engagement side pressure $P_{TA}$ is increased to the target engagement pressure $P_{TA}$, set based on the input torque after setting the predetermined low pressure $P_{S2}$, the shift may be started with the predetermined low pressure $P_{S2}$ because the predetermined low pressure $P_{S2}$ may be higher than the target engagement pressure $P_{TA}$. Then, even if the target engagement pressure is corrected at that time, the target values (the target time and the target change rate), are not achieved in the next execution (cycle) of the control routine. Therefore, the predetermined value $P_{OFF\ SET}$ is set.

Then, when the inequality $P_{S2}+P_{OFF\ SET}<P_{TA}$ is not satisfied at step S36, it is determined that the input torque is too large and that learning correction should be applied to the target engagement pressure $P_{TA}$, and the learning correction is then performed so that the target engagement pressure $P_{TA}$ is raised a predetermined amount in step S37 ($P_{TA}=P_{TA}+dP_{TA}$), as indicated by the line of alternating long and short dashes in FIG. 6(c). When the inequality ($P_{S2}+P_{OFF\ SET}>P_{TA}$) is satisfied in step S36, it is determined that the input torque is too low and the target values are not achieved in the next cycle even if the learning correction is applied to the target engagement pressure $P_{TA}$, and the predetermined low pressure $P_{S2}$ is corrected by addition of predetermined pressure increment ($P_{S2}=P_{S2}+dP_{S2}$) so that the target values are achieved in the next cycle.

Figure 8:
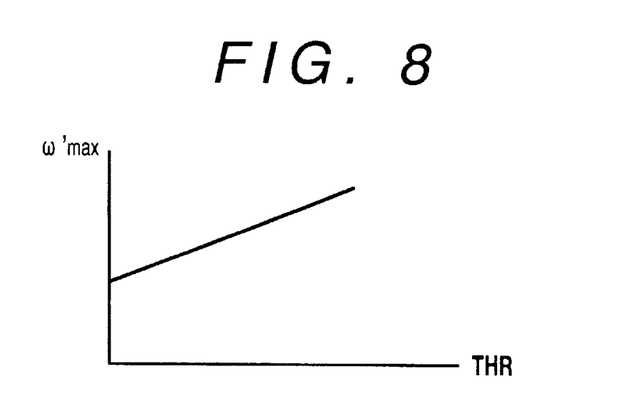
FIG. 8 is a graph of change of maximum value for target change rate $\omega'$ max versus change in throttle opening.

Further, as shown in FIG. 8, the target change rate maximum value $\omega'$ max is stored in a map as a function of the throttle opening. The maximum value $\omega'$ max increases as the throttle opening increases, and the range which can be controlled based on the first fill time $t_{SA}$ in the servo starting control, becomes larger.

Therefore, when the start time is longer than the predetermined time, a proper control scheme is selected based on, for example, the rotational speed change rate $\omega_S'$ at the start of the rotational change at the input shaft, and learning correction is performed so that the start time remains proper.

The teachings of Japanese Application Serial No. H09-218765 filed Aug. 13, 1997, inclusive of its specification, claims and drawings, are incorporated by reference herein.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A hydraulic control system for use in an automatic transmission to control a shift to a predetermined gear ratio by engaging a first frictional engagement element and disengaging a second frictional engagement element in accordance with a shift control routine for shift control of an engagement side pressure and a disengagement side pressure, wherein the automatic transmission includes: an input shaft which receives torque from an engine; an output shaft which is connected to vehicle wheels; and a plurality of frictional engagement elements for selectively changing a torque transmission path between the input shaft and the output shaft, including the first frictional engagement element and the second frictional engagement element;

wherein said hydraulic control system comprises:

a plurality of hydraulic servos for engaging and disengaging the frictional engagement elements in accordance with the engagement side and disengagement side pressures;

a rotation change start detector which detects a start of change in rotational speed of the input shaft during the shift control;

a rotation change rate detector which detects rate of change in the rotational speed of the input shaft at the detected start of the rotational speed change during the shift control;

a learning controller which corrects the shift control based on a determination of time between start of execution of the shift control routine and the start of rotational speed change detected by the rotation change start detector and on the rate of change in the rotational speed of the input shaft detected by the rotation change rate detector; and an adjusting device for adjusting at least an engagement side pressure applied to the hydraulic servo for the first frictional engagement element, responsive to a predetermined signal from the learning controller.

2. A hydraulic control system according to claim 1, wherein said learning controller corrects a servo starting control routine in which a hydraulic pressure is applied to the hydraulic servo for the first frictional engagement element to advance its piston to a point where the frictional engagement element is taken to a state which immediately precedes torque transmission, and corrects a torque phase control by which the hydraulic pressure in the hydraulic servo for the first frictional engagement element is increased to a target engagement pressure which immediately precedes detection of the start of the rotational change.

3. A hydraulic control system according to claim 2 wherein said learning controller, when said time from the shift control start to the rotational speed change start is longer than a predetermined basic time and when said rate of rotational speed change at the start of the rotational speed change is larger than a predetermined value, makes a determination that filling of the hydraulic servo for the first frictional engagement element is not sufficient and wherein, responsive to said determination, the learning controller makes a correction by increasing said time.

4. A hydraulic control system according to claim 3, wherein the change in rotational speed of the input shaft is a change relative to the rotational speed of the output shaft and is indicative of start of a shift to the predetermined gear ratio.

5. A hydraulic control system according to claim 2, wherein said learning controller, when said time from the shift control start to the start of the rotational speed change is longer than a predetermined basic time and when said rate of rotational speed change is smaller than a predetermined value, makes a determination that the target engagement pressure is too low, and, responsive to said determination, increases a target amount for the engagement side pressure.

6. A hydraulic control system according to claim 5, wherein the change in rotational speed of the input shaft is a change relative to the rotational speed of the output shaft and is indicative of start of a shift to the predetermined gear ratio.

7. A hydraulic control system according to claim 2, wherein the change in rotational speed of the input shaft is a change relative to the rotational speed of the output shaft and is indicative of start of a shift to the predetermined gear ratio.

8. A hydraulic control system according to claim 1 wherein said learning controller, when said time from the shift control start to the rotational speed change start is longer than a predetermined basic time and when said rate of rotational speed change at the start of the rotational speed change is larger than a predetermined value, makes a determination that filling of the hydraulic servo for the first frictional engagement element is not sufficient and wherein, responsive to said determination, the learning controller makes a correction by increasing said time.

9. A hydraulic control system according to claim 8, wherein the change in rotational speed of the input shaft is a change relative to the rotational speed of the output shaft and is indicative of start of a shift to the predetermined gear ratio.

10. A hydraulic control system according to claim 1, wherein said learning controller, when said time from the shift control start to the start of the rotational speed change is longer than a predetermined basic time and when said rate of rotational speed change is smaller than a predetermined value, makes a determination that the target engagement pressure is too low, and, responsive to said determination, increases a target amount for the engagement side pressure.

11. A hydraulic control system according to claim 10, wherein the change in rotational speed of the input shaft is a change relative to the rotational speed of the output shaft and is indicative of start of a shift to the predetermined gear ratio.

12. A hydraulic control system according to claim 1, wherein the change in rotational speed of the input shaft is a change relative to the rotational speed of the output shaft and is indicative of start of a shift to the predetermined gear ratio.

* * * * *

UNITED STATES PATENT AND TRADEMARK OFFICE
CERTIFICATE OF CORRECTION

PATENT NO. : 6,259,983 B1
DATED : July 10, 2001
INVENTOR(S) : Tsutsui et al.

It is certified that error appears in the above-identified patent and that said Letters Patent is hereby corrected as shown below:

Column 5,
Line 28, "56" should read -- S6 --; and
Line 39, "SB" should read -- S8 --.

Column 6,
Line 12, "(ω a')" should read -- $\omega_a'$ --;
Line 13, "(dωs)" should read -- $(d\omega_s)$ --;
Line 14, "ωa')" should read -- $\omega_a'$ --;
Line 16, "ωa')" should read -- $\omega_a'$ --; and
Line 48, "NT" should read -- $N_T$ --.

Column 7,
Line 1, "$g_{/+1}$" should read -- $g_{i+1}$ --.

Column 9,
Line 30, "ωa'" should read -- $\omega_a'$ --;

Signed and Sealed this

Thirtieth Day of July, 2002

Attest:

JAMES E. ROGAN
Attesting Officer     Director of the United States Patent and Trademark Office